(12) United States Patent
Terada

(10) Patent No.: US 7,298,764 B2
(45) Date of Patent: Nov. 20, 2007

(54) IMAGE RECORDING METHOD AND DEVICE, AND IMAGE CONVERTING METHOD AND DEVICE

(75) Inventor: Masahiro Terada, Saitama (JP)

(73) Assignee: FUJIFILM Corporation, Kanagawa (JP)

(*) Notice: Subject to any disclaimer, the term of this patent is extended or adjusted under 35 U.S.C. 154(b) by 802 days.

(21) Appl. No.: 10/790,021

(22) Filed: Mar. 2, 2004

(65) Prior Publication Data
US 2004/0190462 A1    Sep. 30, 2004

(30) Foreign Application Priority Data
Mar. 11, 2003   (JP)   ............. 2003-065146

(51) Int. Cl.
*H04J 3/04*   (2006.01)

(52) U.S. Cl. ............. 370/535; 356/96; 356/98

(58) Field of Classification Search ............. 370/535, 370/537, 538, 540; 386/60, 94, 95, 96, 98; 348/473, 474, 482
See application file for complete search history.

(56) References Cited

U.S. PATENT DOCUMENTS

| | | | |
|---|---|---|---|
| 6,975,746 B2 * | 12/2005 | Davis et al. | 382/100 |
| 7,239,801 B2 * | 7/2007 | Himeno et al. | 386/112 |
| 2004/0179820 A1 * | 9/2004 | Kashiwagi et al. | 386/95 |
| 2004/0213549 A1 * | 10/2004 | Himeno et al. | 386/60 |
| 2004/0223746 A1 * | 11/2004 | Himeno et al. | 386/96 |
| 2005/0158016 A1 * | 7/2005 | Himeno et al. | 386/4 |
| 2005/0163474 A1 * | 7/2005 | Himeno et al. | 386/52 |
| 2006/0159303 A1 * | 7/2006 | Davis et al. | 382/100 |

FOREIGN PATENT DOCUMENTS

| | | |
|---|---|---|
| JP | 11-296312 A | 10/1999 |
| JP | 2001-24983 A | 1/2001 |

* cited by examiner

*Primary Examiner*—Ajit Patel
(74) *Attorney, Agent, or Firm*—Birch, Stewart, Kolasch & Birch, LLP (57) ABSTRACT

An MPEG compression circuit records attached information (referred to as FF_PCK) at the initial address of a VOBU in which NV_PCK is to be recorded. NV_PCK is playback auxiliary information and is referred to when playing back moving images in DVD-Video format. Attached information (FF_PCK) has a data size equal to or larger than NV_PCK. FF_PCK is replaced by NV_PCK when converting MPEG2 data into DVD-Video data. As a result, it is not necessary to demultiplex and remultiplex moving image data and sound data so that data can be converted efficiently.

8 Claims, 7 Drawing Sheets

IMAGE RECORDING METHOD AND DEVICE, AND IMAGE CONVERTING METHOD AND DEVICE

This Nonprovisional application claims priority under 35 U.S.C. § 119(a) on patent application Ser. No(s). 2003-065146 filed in JAPAN on Mar. 11, 2003, the entire contents of which are hereby incorporated by reference.

BACKGROUND OF THE INVENTION

1. Field of the Invention

The present invention relates to an image recording method and a device which encode, split and multiplex moving image data and sound data associated with moving image data by predetermined sizes, and an image converting method and a device which convert multiplexed moving image data and sound data into playback data format in which playback auxiliary information is to be recorded.

2. Background Arts

Figure 7:
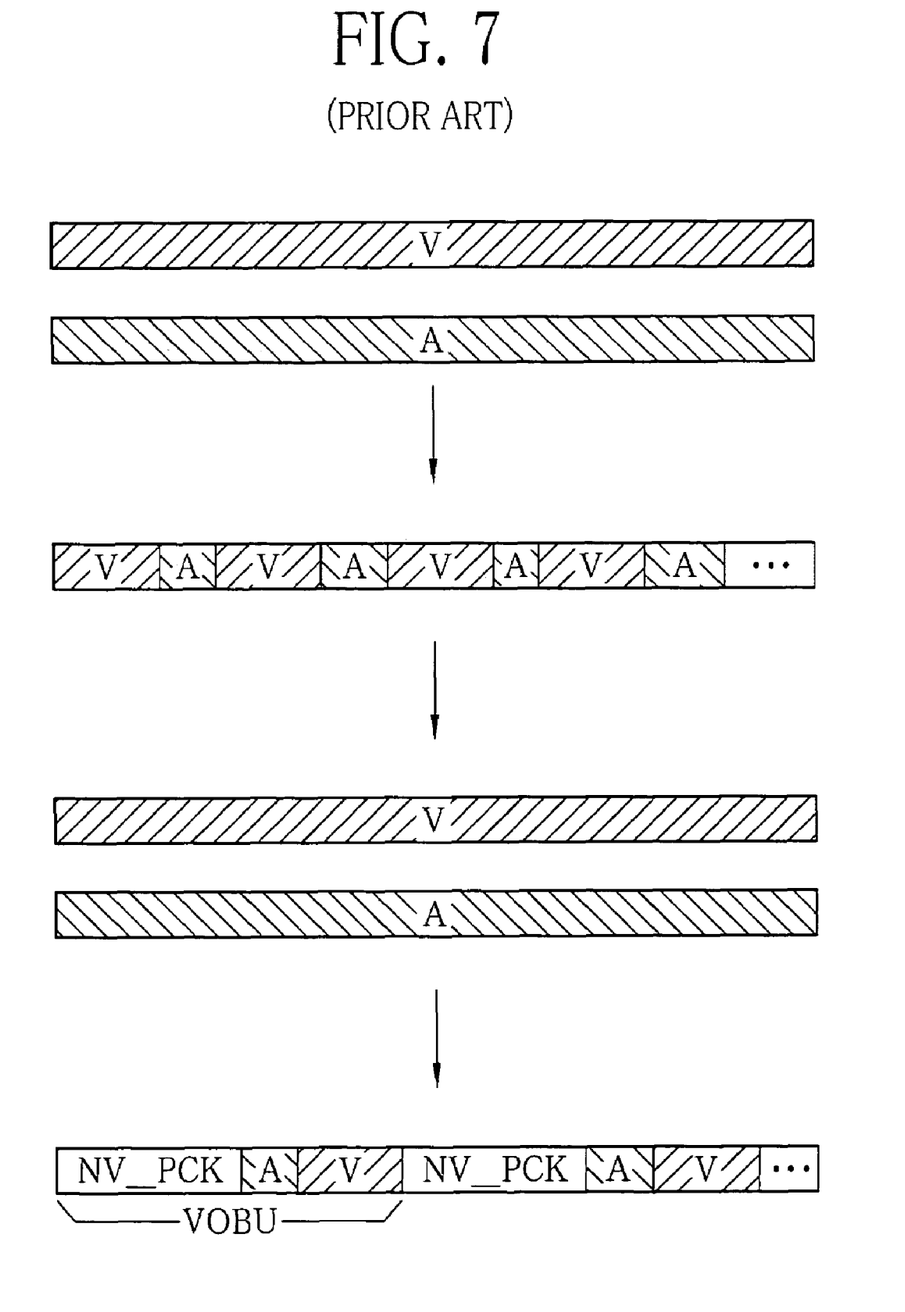
FIG. 7 is an explanatory view showing the steps of conventional processes of recording and converting the image.

MPEG2 (Moving Picture Experts Group Phase2) is widely used as a format to compress moving image data with sound data obtained by image recording devices such as a digital camera, a video camera, and the like. Referring to the upper portion of FIG. 7, moving image data V and sound data A, associated with the moving image data V, are independent data streams respectively. The moving image data V and the sound data A are encoded and multiplexed in MPEG2 format.

Japanese Patent Laid-Open Publication No. 11-296312 discloses a method to packetize compressively encoded sound data followed by compressively encoded moving image data, and record the packet data in a recording medium. Each packet data has the size of integer multiplication of fixed data block.

Further, in Japanese Patent Laid-Open Publication No. 2001-24983, encoded data obtained by encoding moving image data is temporarily buffered until the encoded data has the size of certain units. At the same time, attached information related to the encoded data is also buffered. Buffered attached information is multiplexed in a predetermined area of the encoded data of certain units.

Processing (See the lower portion of FIG. 7) is carried out in order to convert compressed moving image data with sound data, which is compressed by MPEG2 format, into DVD (Digital Video/Versatile Disc)-Video format data. In other words, multiplexed moving image data V and sound data A in MPEG2 format are demultiplexed to form respective data streams again. Thereafter, the data streams are remultiplexed by inserting NV_CPK, which is playback auxiliary information unique to DVD-video format, at the initial address of a unit (VOBU, Video Object Unit) which includes the sound data A and the moving image data V.

When the MPEG2 format data is converted into the DVD-Video format data by the above-mentioned method, an additional area in a memory is necessary to temporarily buffer demultiplexed moving image data V and sound data A. Further, the above-mentioned method is inefficient since it requires additional time for remultiplexing the data streams. Therefore, the above-mentioned problems cannot be solved by the methods disclosed in Japanese patent laid-open publications No. 11-296312 and No. 2001-24983, since demultiplexing and remultiplexing processes cannot be omitted to form the DVD-Video format data.

SUMMARY OF THE INVENTION

An object of the present invention is to provide an image recording method and a device which can perform effective data conversion without demultiplexing and remultiplexing moving image data and sound data.

Another object of the present invention is to provide an image converting method and a device which can convert a recording format of the moving image data with the sound data recorded by the above-mentioned recording method/device.

To achieve the above objects, an image recording device according to the present invention comprises encoding means for encoding the moving image data, the sound data and attached information related to the moving image data and the sound data, and multiplex recording means for splitting and multiplexing encoded attached information, encoded sound data and encoded moving image data by predetermined sizes respectively. The encoded attached information has a unique identifying code and a data size equal to or larger than playback auxiliary information which is referred to in playing back the moving image. The encoded attached information is recorded in an area where the playback auxiliary information is to be recorded. It is preferable that the multiplex recording is carried out according to MPEG2 format.

When multiplexed attached information, sound data and moving image data is converted into playback data format in which the playback auxiliary information is to be recorded, it is identified whether the attached information is recorded according to an identifying code in an area where the playback auxiliary information is to be recorded.

When the attached information is identified, the playback auxiliary information, which has a data size that can replace the attached information, is generated. Thereafter, the identified attached information is replaced by the playback auxiliary information. It is preferable to use DVD-Video data format as playback data format.

According to the present invention, the attached information is easily replaced by the playback auxiliary information when multiplexed moving image data and sound data is converted into playback data format. Therefore, data conversion is performed effectively since it is not necessary to demultiplex and remultiplex the moving image data and the sound data.

BRIEF DESCRIPTION OF THE DRAWINGS

The above objects and advantages of the present invention will become apparent from the following detailed descriptions of the preferred embodiments when read in association with the ac companying drawings, which are given by way of illustration only and thus do not limit the present invention. In the drawings, the same reference numerals designate like or corresponding parts throughout the several views, and wherein.

DETAILED DESCRIPTION OF THE EMBODIMENTS

Figure 1:
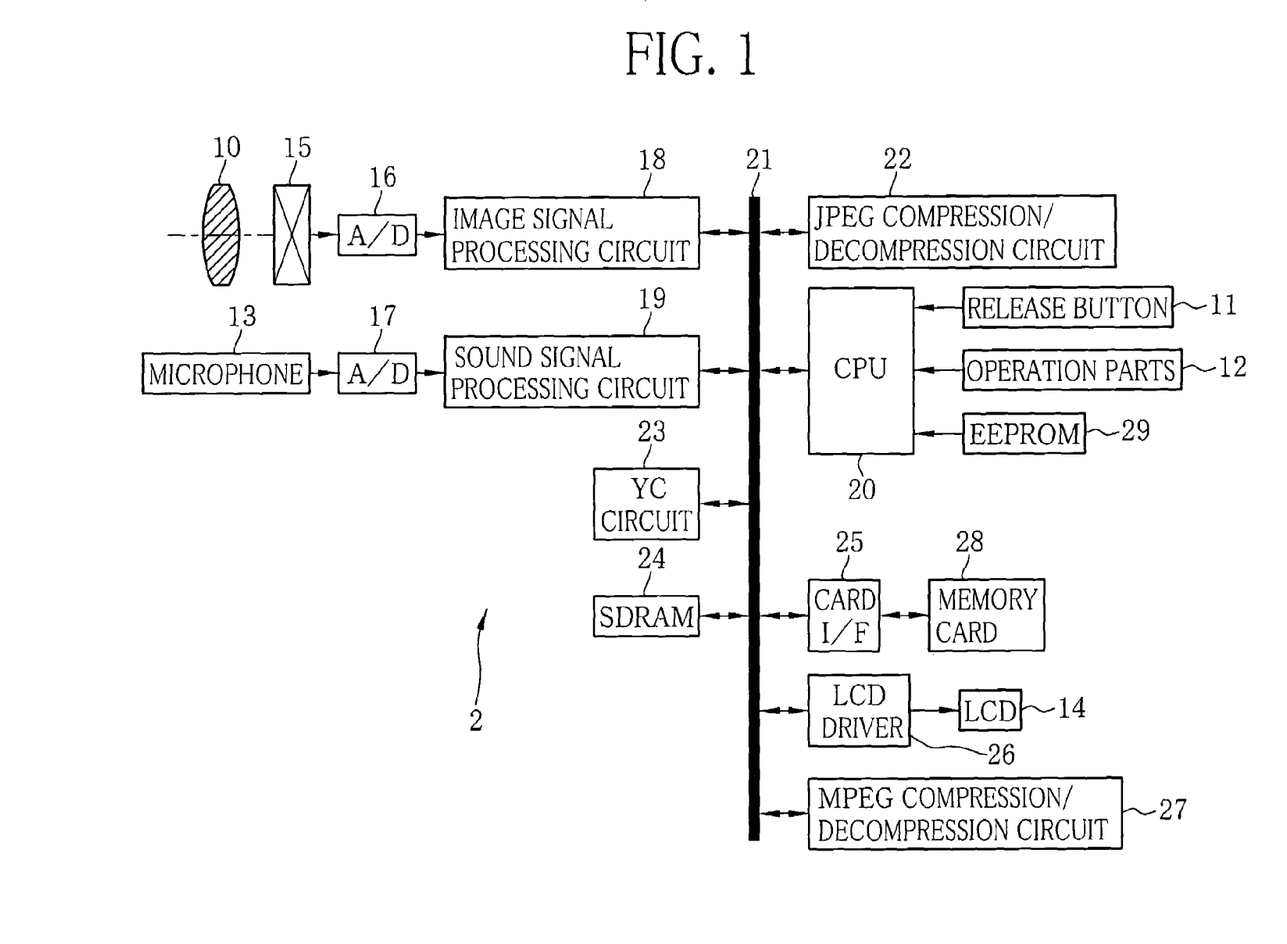
FIG. 1 is a block diagram showing electrical configuration of a digital camera.

Referring to FIG. 1, a digital camera 2 is provided with a taking lens 10, a release button 11, operation parts 12, a microphone 13, and a liquid crystal display (LCD) 14. By pressing the release button 11, the taking lens 10 allows subject light into a CCD 15 disposed behind the taking lens 10.

An imaging signal output from the CCD 15 is input to a correlated double sampling circuit (not shown), and then output as image data of R, G, and B, each of which precisely corresponds to accumulated charge amount in each cell of the CCD 15. Image data output from the correlated double sampling circuit is amplified in an amplifier (not shown) and converted into digital data in an A/D converter 16. Image data is sent to the LCD 14 to display so-called "through the lens image".

The operation parts 12 include a power supply switch for turning on/off the power supply, and a mode selector switch for selecting various modes. The digital camera 2 has following selectable modes: a still image taking mode for taking still images, a moving image taking mode for taking moving images, a playback mode for displaying the taken images on the LCD 14, a set up mode for setting up various settings, and the like. Ambient sound is recorded through a microphone 13 while taking the moving images in the moving image taking mode. The sound recorded by the microphone 13 is converted into digital sound data by the A/D converter 17.

Image data output from the A/D converter 16 is sent to an image signal processing circuit 18, and is subject to various kinds of image processing, such as gradation conversion, white balance correction, γ correction processing, and the like. Sound data output from the A/D converter 17 is sent to a sound signal processing circuit 19, and is subject to various processes, for instance, noise elimination.

The CPU 20 is connected to each circuit through a system bus 21 to control the whole operation of the digital camera 2. A JPEG compression/decompression circuit 22, a YC circuit 23, an SDRAM 24, a card I/F 25, an LCD driver 26, and an MPEG compression circuit 27 are connected to the system bus 21.

After being subjected to various processes in the image signal processing circuit 18, image data is converted into YC image data, including a luminance signal Y and color-difference signals Cr and Cb, in the YC circuit 23. The JPEG compression/decompression circuit 22 compresses the YC image data in JPEG format. Image data compressed in the JPEG compression/decompression circuit 22 is stored in a memory card 28, which is removably inserted in the digital camera 2, through the card I/F 25. Alternatively, image data compressed in the JPEG compression/decompression circuit 22 is converted into composite signals in the LCD driver 26 to display the image in the LCD 14.

An EEPROM 29 is connected to the CPU 20 in addition to the release button 11 and the operation parts 12. Various control programs and setting information are recorded in the EEPPROM 29. The CPU 20 reads the information from the EEPROM 29 to the SDRAM 24, which is a work memory, in order to carry out various processes.

Figure 2:
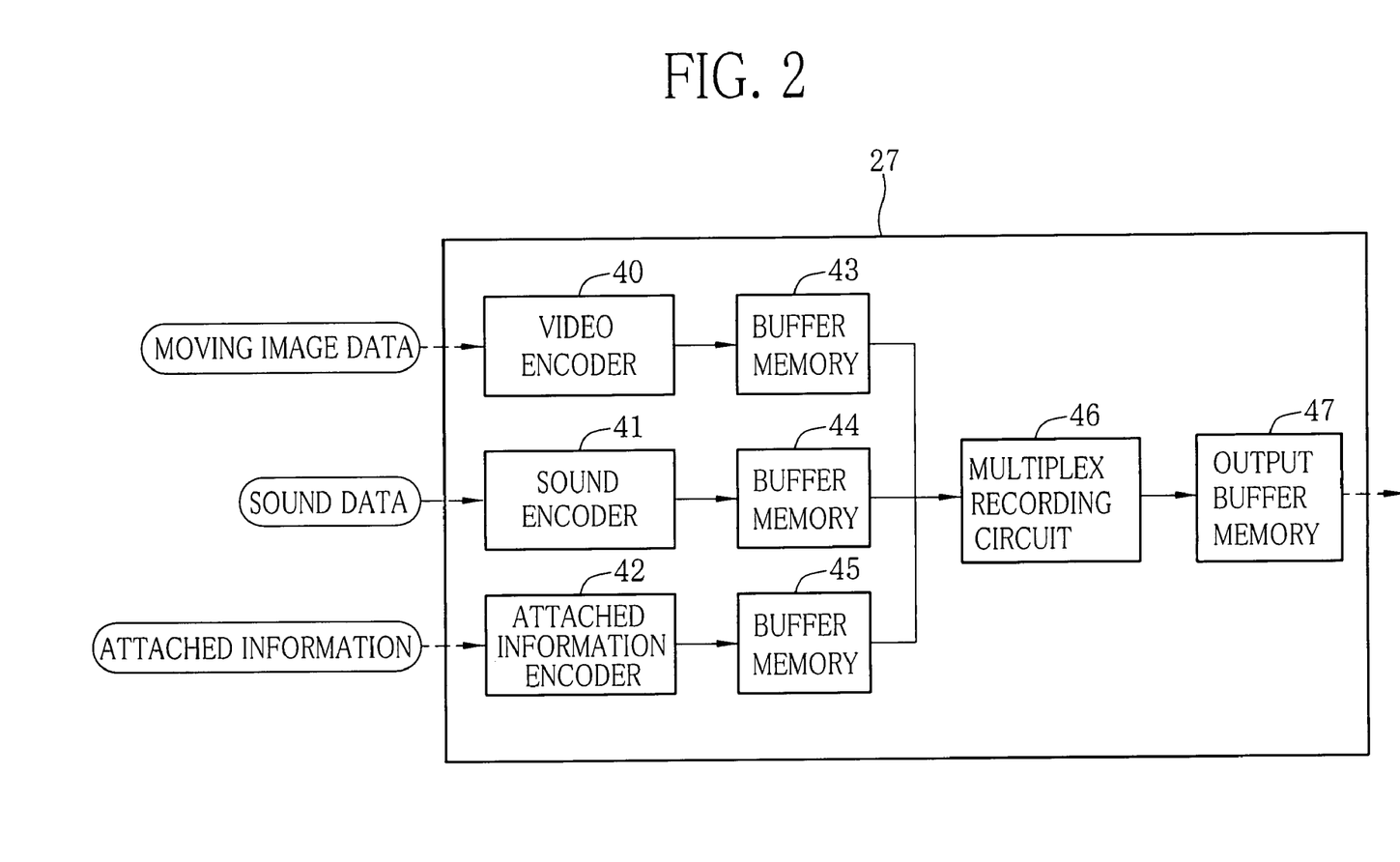
FIG. 2 is a block diagram showing internal configuration of an MPEG compression circuit.

The MPEG compression circuit 27 compresses moving image data and sound data in MPEG2 format. Referring to FIG. 2, the MPEG compression circuit 27 has a video encoder 40, a sound encoder 41, an attached information encoder 42, buffer memories 43-45, a multiplex recording circuit 46, and an output buffer memory 47.

The video encoder 40 encodes moving image data sent from the image signal processing circuit 18. The sound encoder 41 encodes sound data associated with moving image data which is encoded by the video encoder 40. The attached information encoder 42 encodes attached information related to encoded moving image data and encoded sound data. Each encoded data is stored in the buffer memories 43-45 respectively.

Figure 3:
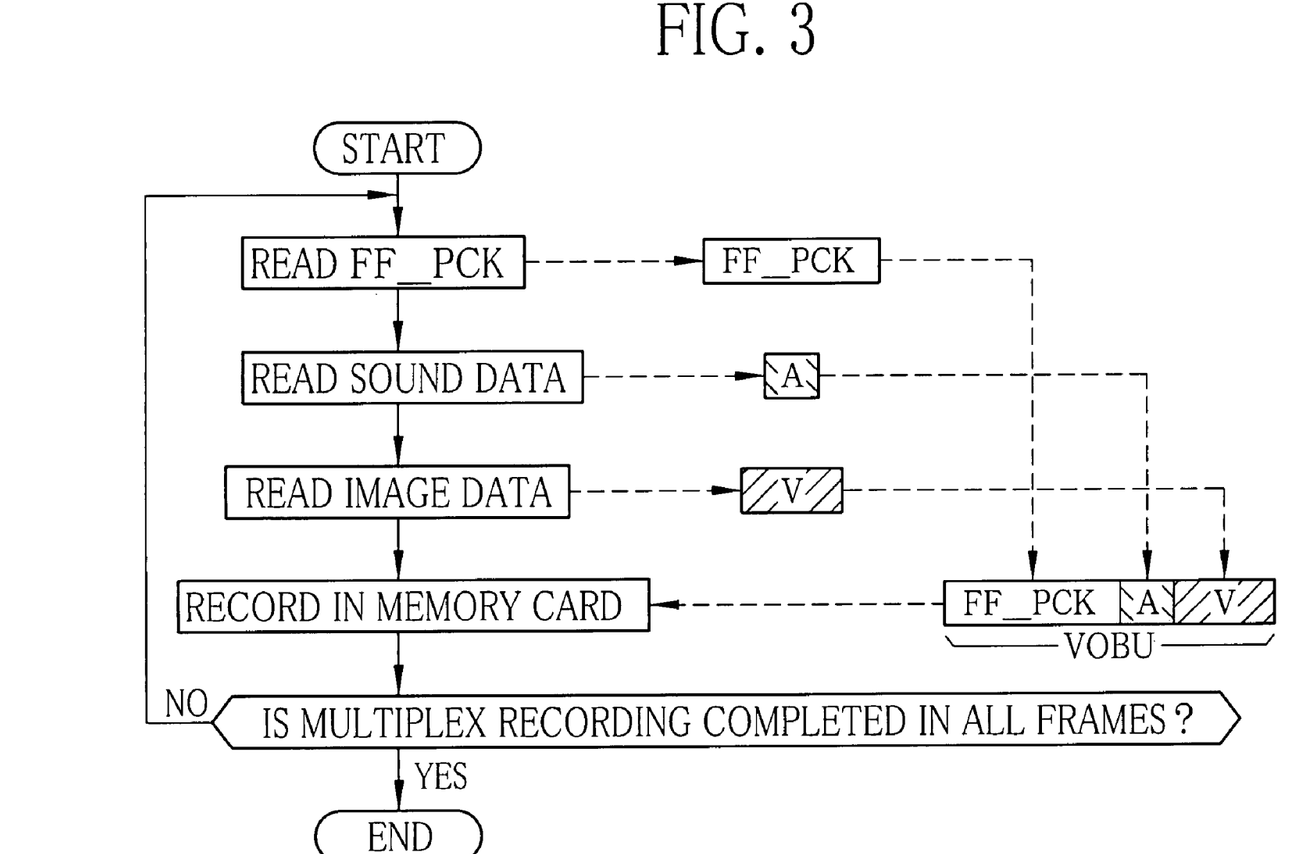
FIG. 3 is a flow chart showing the steps of a multiplex recording process.

The multiplex recording circuit 46 multiplexes each data by the steps shown in FIG. 3. First, encoded attached information (referred to as FF_PCK), which is encoded by the attached information encoder 42, is read out from the buffer memory 45 by, a predetermined data size. Next, the encoded sound data of one VOBU, which is encoded by the sound encoder 41, is read out from the buffer memory 44 and appended to FF_PCK. Then, encoded moving image data of one VOBU, which is encoded by the video encoder 40, is read out from the buffer memory 43 and appended to encoded sound data. Thereafter, multiplexed data is sent to the output buffer memory 47 and recorded in the memory card 28. The multiplex recording circuit 46 repeats the above-mentioned steps until all the frames of taken moving images are multiplexed.

FF_PCK has the same data size (2,048 bytes) as NV (navigation)_PCK, which is playback auxiliary information used as a reference while playing back the moving images in DVD-Video format, and is recorded at the initial address of a VOBU where NV_PCK is to be recorded. A unique identifying code is attached to FF_PCK for identifying the recorded position and the data size. FF_PCK is replaced by NV_PCK when the MPEG2 data is converted into the DVD-video data. FF_PCK may have larger data size than NV_PCK as long as FF_PCK is replaceable.

Figure 4:
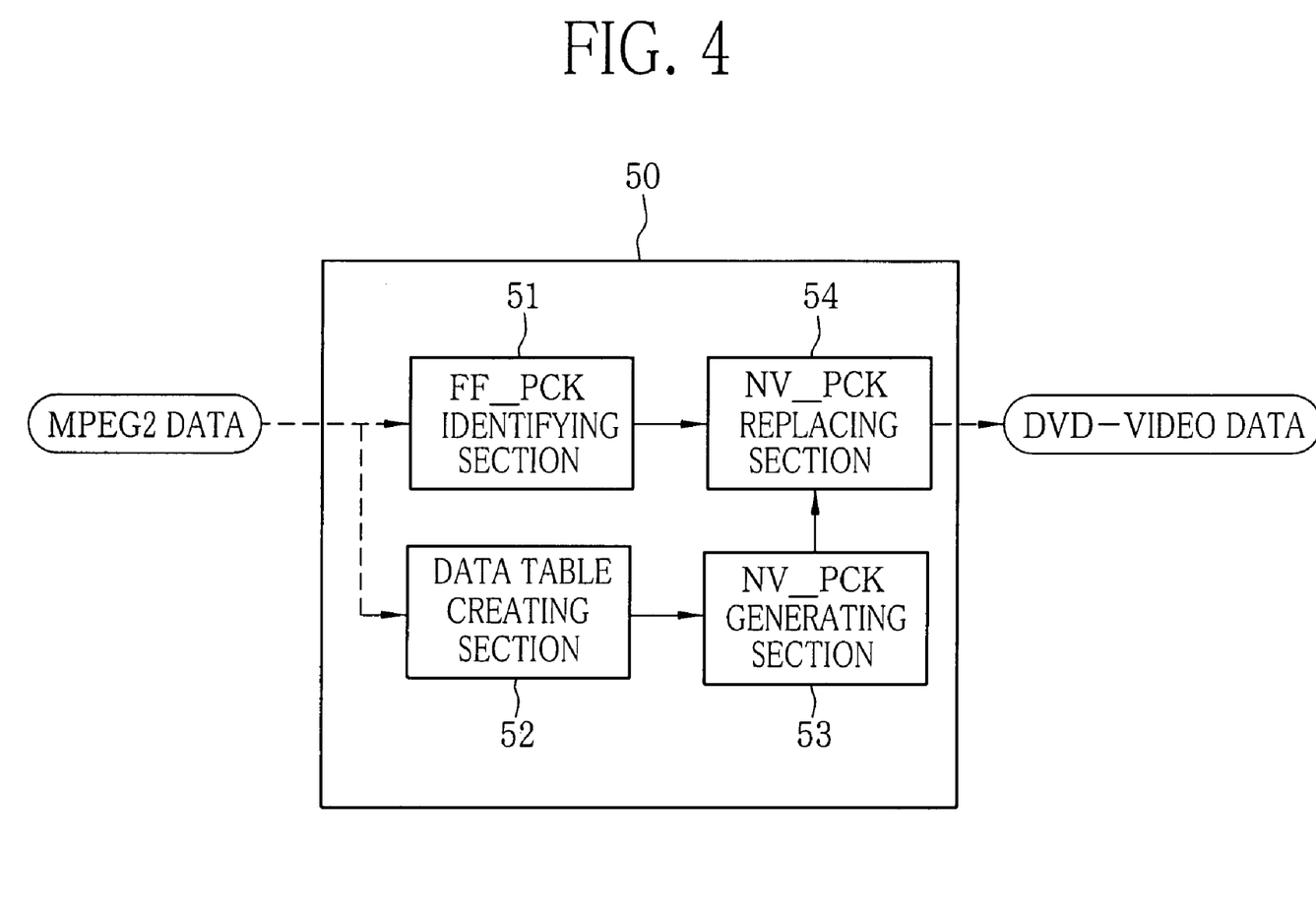
FIG. 4 is a block diagram showing outlined configuration of an image converting device according to the present invention.

Referring to FIG. 4, an image converting device 50 converts compressed MPEG2 data compressed by the above-mentioned steps into DVD-video data, and includes an FF_PCK identifying section 51, a data table creating section 52, a NV_PCK generating section 53, and a NV_PCK 54 replacing section 54.

The FF_PCK identifying section 51 identifies whether FF_PCK is recorded at the initial address of the VOBU of MPEG2 data, which is input in the image converting device 50, according to the identifying code attached to FF_PCK. The data table creating section 52 creates a data table for generating NV_PCK which corresponds to input MPEG2 data. The NV_PCK replacing section 54 replaces FF_PCK by NV_PCK, which is generated in the NV_PCK generating section 53.

Figure 5:
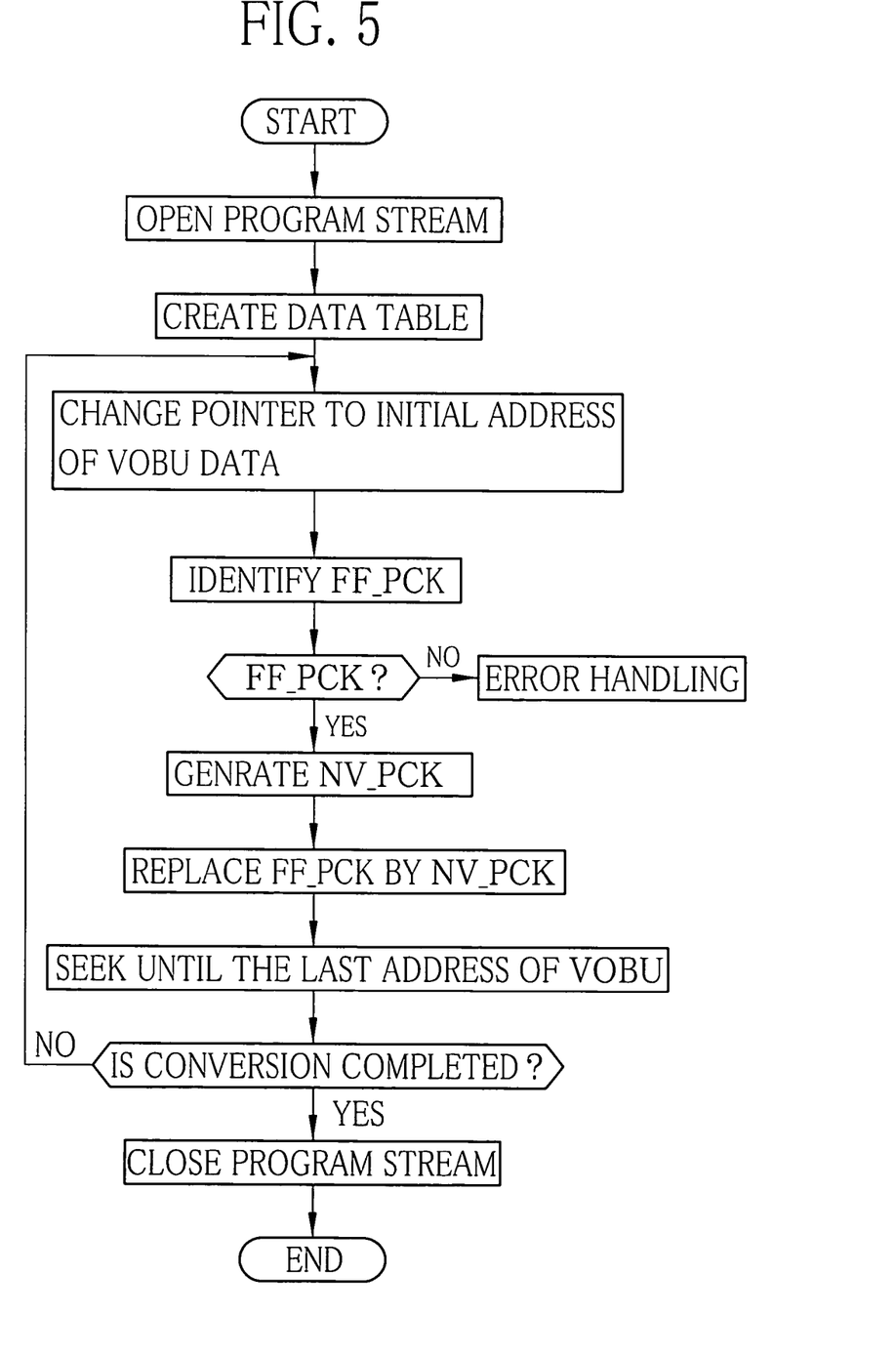
FIG. 5 is a flow chart showing the steps of an image converting process.
Figure 6:
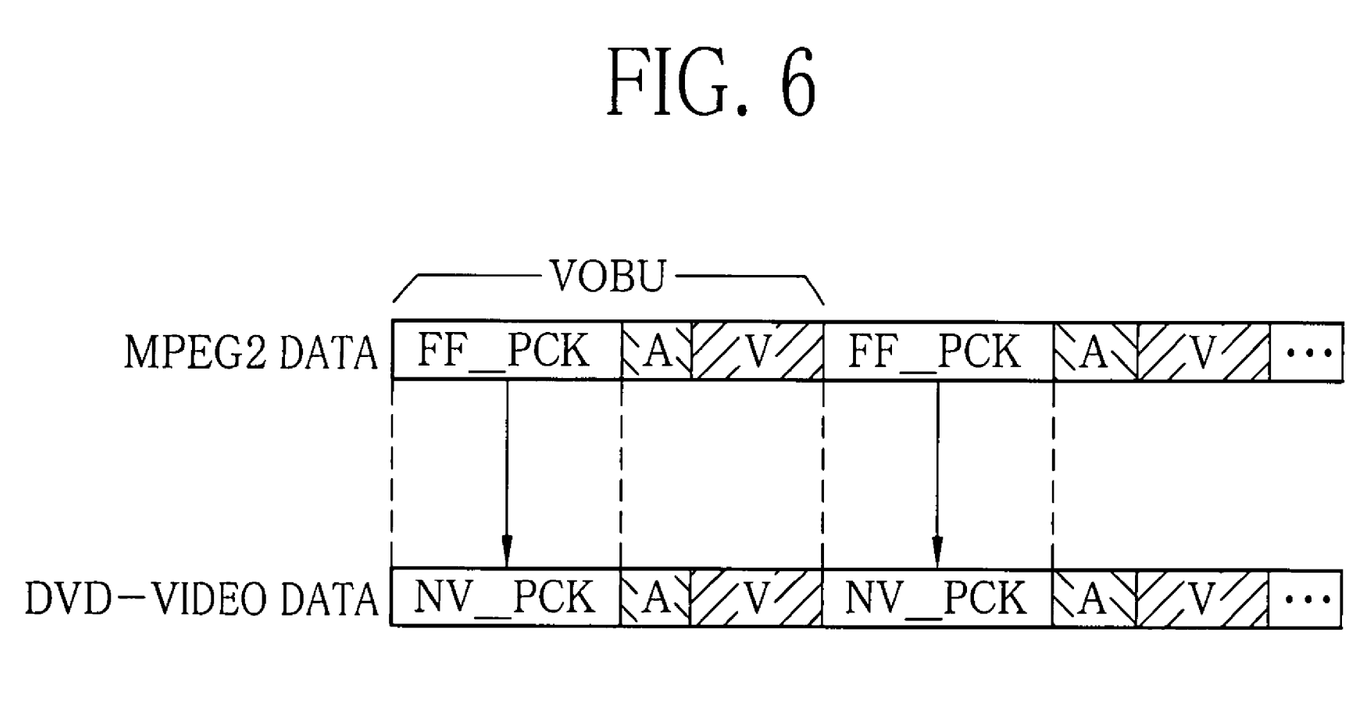
FIG. 6 is an explanatory view schematically showing the image converting process.

Referring to FIG. 5 and FIG. 6, an operation of the image converting device 50 in the above configuration is explained. First, a program stream of input MPEG2 data is open and the data table is created in the data table creating section 52 as a preparation.

After preparation, a VOBU of MPEG2 data is retrieved into the FF_PCK identifying section 51, and a pointer is moved at the initial address of the retrieved VOBU. Then, the FF_PCK identifying section 51 identifies whether FF_PCK is recorded at the initial address of the VOBU. When FF_PCK is not recorded at the initial address of the VOBU, an error handling step is carried out.

When FF_PCK is recorded at the initial address of the VOBU, the NV_PCK generating section 53 generates NV_PCK according to the data table created in the data table creating section 52. Then, the NV_PCK replacing section 54 replaces FF_PCK by NV_PCK. Since FF_PCK has the same data size as NV_PCK, and is recorded at the initial address of the VOBU where NV_PCK is to be recorded, the replacement can be carried out easily.

The conversion of the VOBU is completed when seek is operated through the last address of the VOBU with replaced NV_PCK. The image converting device 50 repeats the above-mentioned converting process until all VOBUs of input MPEG2 data are converted. Thereafter, the converting process is completed by closing the program stream. In the above-mentioned configuration, it is not necessary to demultiplex and remultiplex moving image data and sound data when converting MPEG2 data into DVD-Video Data. As a result, the data conversion can be carried out efficiently.

In the above embodiment, digital camera 2 is described as an example. However, the present invention can be applied to other image recording devices for recording moving image data with sound data, such as a video camera, a cellular phone, a PDA, and the like. Further, MPEG2 data can also be converted into DVD-VR (Video recording format) data or any other data as long as playback auxiliary data can be recorded at the initial address of the VOBU.

What is claimed is:

1. An image recording method for multiplexing moving image data and sound data associated to said moving image data, said image recording method comprising the steps of:
   encoding said moving image data, said sound data and attached information related to said moving image data and said sound data, wherein encoded attached information having a unique identifying code; and
   splitting and multiplexing said encoded attached information, said encoded sound data and said encoded moving image data by predetermined data sizes respectively, wherein said encoded attached information has a data size equal to or larger than playback auxiliary information which is referred to in playing back said moving image, wherein said encoded attached information is recorded in an area where said playback auxiliary information is to be recorded.

2. An image recording method as recited in claim 1, wherein said moving image data is encoded according to MPEG2 format.

3. An image recording device for multiplexing moving image data and sound data associated with moving image data, said image recording device comprising:
   an encoding means for encoding said moving image data, said sound data and attached information related to said moving image data and said sound data, wherein encoded attached information having a unique identifying code; and
   multiplex recording means for splitting and multiplexing said encoded attached information, said sound data and said moving image data by predetermined data sizes respectively, wherein said encoded attached information has a data size equal to or larger than playback auxiliary information which is referred to in playing back said moving image, wherein said encoded attached information is recorded in an area where said playback auxiliary information is to be recorded.

4. An image recording device as recited in claim 3, wherein said moving image data is encoded according to MPEG2 format.

5. An image converting method for converting said moving image data and said sound data multiplexed by said image recording method as claimed in claim 1 into playback data format in which said playback auxiliary information is to be recorded, said image converting method comprising the steps of:
   identifying whether said attached information is recorded according to said identifying code in said area where said playback auxiliary information is to be recorded;
   generating said playback auxiliary information having a data size that can replace said attached information; and
   replacing said attached information by said playback auxiliary information.

6. A data converting method as claimed in claim 5, wherein said playback data format is DVD-Video data format.

7. A data converting device for converting said moving image data and said sound data multiplexed by said image recording device as claimed in claim 3 into said playback data format in which said playback auxiliary information is to be recorded, said data recording device comprising:
   identifying means for identifying whether said attached information is recorded according to said identifying code in said area where said playback auxiliary information is to be recorded;
   generating means for generating said playback auxiliary information having a data size that can replace said attached information; and
   replacing means for replacing said attached information by said playback auxiliary information.

8. A data converting device as recited in claim 7, wherein said playback data format is DVD-Video data format.

* * * * *